Aug. 6, 1946.  C. F. J. DUPUY  2,405,494
AIR TREATING APPARATUS
Filed March 29, 1944
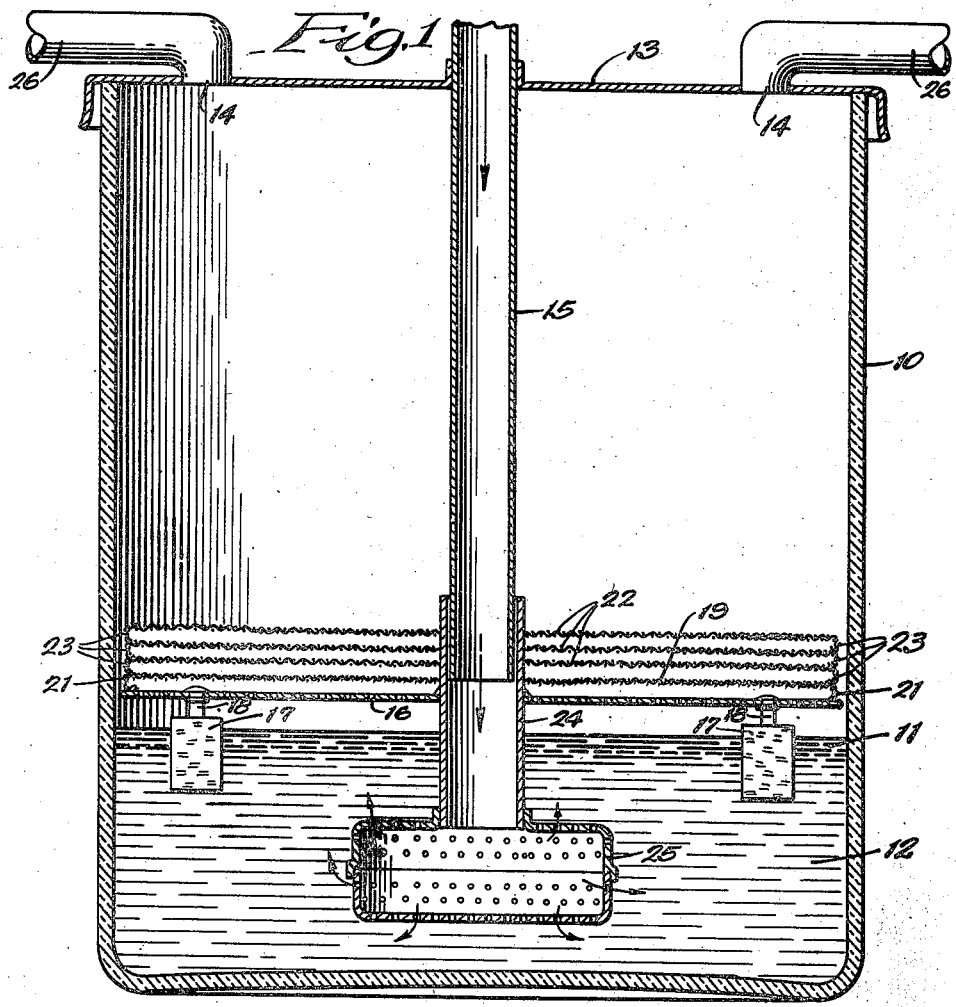
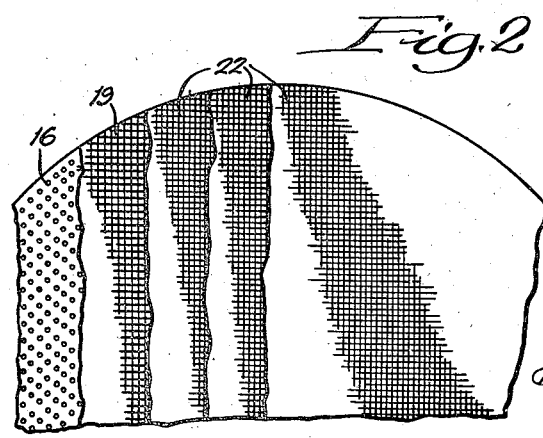
Inventor:
Charles F. J. Dupuy,
By Dawson, Ormsby Barth,
Attorneys.

Patented Aug. 6, 1946

2,405,494

UNITED STATES PATENT OFFICE 2,405,494

AIR TREATING APPARATUS

Charles F. J. Dupuy, Mahwah, N. J., assignor to O-Cedar Corp'n, Chicago, Ill., a corporation of Illinois Application March 29, 1944, Serial No. 528,531

1 Claim. (Cl. 183—10)

This invention relates to air treating apparatus, and more particularly to the treatment of air to add water and other volatile liquid vapors thereto for humidification, deodorization, sterilization, medication or the like.

One of the objects of the invention is to provide air treating apparatus in which air is humidified and simultaneously has added thereto vapors of volatile liquids such as deodorants, fumigants, medicaments or the like.

Still another object of the invention is to provide air treating apparatus in which the air does not carry any unvaporized particles.

Still another object of the invention is to provide air treating apparatus in which moisture particles are removed from the air by screens which are vibrated to shake collected particles therefrom. Preferably, vibration of the screens is accomplished by floating them on the body of liquid so that they will be vibrated as the liquid is agitated.

A still further object of the invention is to provide air treating apparatus in which uniform results are obtained regardless of variations in the quantity of liquid in the apparatus.

The above and other objects, and advantages of the invention will be more readily apparent from the following description when read in connection with the accompanying drawing in which—

Fig. 1 is a central section of an apparatus embodying the invention; and

Fig. 2 is a plan view of the screens with parts broken away.

The apparatus, as shown, comprises a tank or container 10 adapted to contain a body of liquid which is preferably made up in part of water and in part of a volatile treating liquid. In the embodiment shown, the treating liquid may be an oil which will float in a layer as indicated at 11, on the water shown at 12 when the apparatus is not in operation. It will be understood, however, that other liquids heavier than water or which are miscible with water may be employed equally well.

The top of the tank 10 is closed by a cover 13 having a series of outlet openings 14 therein, and to which is secured an air inlet pipe 15 extending down into the tank. The pipe 15 may be connected to any desired blower or pump to supply air or other gas to be treated.

Within the container there are provided a plurality of screens spaced vertically and supported closely above the body of liquid as shown, the lowermost screen being formed by a perforated plate 16 which may have a relatively large number of perforations therein, of the order of 200 per square inch. The plate 16 is supported above the liquid in the container by floats 17 connected to the plate through studs 18, and which are adapted to float in the liquid so as to support the plate above the surface thereof, as shown. A second screen indicated at 19 is loosely supported on the plate as for example, by means of down turned flanges or lugs 21 to hold the screen 19 spaced above and movable relatively to the plate 16. The screen 19 is preferably of finer mesh than the perforations in the plate 16 and may, in the example shown, be of the order of 250 mesh.

Above the screen 19 there are supported one or more additional screens 22, three such screens being shown. Each of the screens 22 is loosely supported on the screen next below it by means of down turned flanges or lugs 23 so that the several screens are assembled in a stack and are spaced apart vertically. The screens 22 are preferably of finer mesh than the screen 19 and may be of the order of 300 mesh.

The air to be treated is adapted to be bubbled through the liquid in the tank and for this purpose a discharge pipe 24 is connected to the plate 16 to be supported thereby and telescopes over the inlet pipe 15. At its lower end, the discharge pipe 24 carries a perforated air box 25 having a series of perforations in its top, side and bottom walls through which air may be discharged. The perforations in the walls of the box 25 may be graduated to obtain any desired distribution so that the air will be uniformly supplied to all portions of the tank.

In operation, a body of water and any desired concentration of a volatile treating liquid may be placed in the tank. For fumigating, a liquid such as formaldehyde may be used while for cleaning and purifying air a volatile liquid such as pine oil might be employed. The quantity of volatile liquid added may also be varied to control the amount which will be picked up by the air. Air is then supplied through the inlet pipe 15 and discharged through the air box 25 into the liquid to agitate the liquid. I have found that this agitation may be such as to cause an intimate mixture in the nature of an emulsion between the water and volatile liquid so that in its passage through the liquid body the air in the form of bubbles is intimately contacted with both the water and the volatile liquid. Thus by the time the air rises from the surface of the liquid body it is humidified and is carrying a relatively large quantity of the volatile liquid. With an apparatus of this character liquids which are relatively difficult to vaporize, such as glycerine, may readily be vaporized and carried out by the air.

In bubbling through the liquid the air tends to pick up unvaporized particles and these are removed from the air stream by the series of screens. In some cases, the action may be sufficiently violent to cause a foaming or violent agitation of the liquid so that it will strike the plate 16 and any bubbles will be broken by contact therewith. The air then passes through the several screens in series and any unvaporized particles carried by the air will be collected on the screens.

As the liquid is agitated, the screens will be vibrated or shaken so that liquid particles collected thereon will be shaken loose and drop back into the body of liquid in the container. It will be apparent that the screens could be shaken by other means but the arrangement shown is preferred since it eliminates the necessity of any separate shaking mechanism and maintains the screens properly spaced above the liquid level. Since the air box 25 is carried by the floating screens, it will be maintained at a uniform distance below the liquid surface while the screens are maintained at a uniform distance above the liquid surface regardless of the quantity of liquid in the tank so that the air will be uniformly treated at all times. Thus, with this apparatus, uniformly treated, dry air is discharged through the openings 14.

In using the apparatus in relatively small spaces the openings 14 in the cover 13 may open directly to the space. For larger spaces or where it is desired to distribute the treated air to particular areas, pipes or conduits may be provided communicating with the openings 14. Such pipes may have one or more openings therein and may be of any necessary length to conduct the treated air to the desired points. With relatively elongated pipes having spaced openings throughout their length a substantially uniform distribution throughout a relatively large space can be obtained.

The apparatus may be made of any desired size or could be used in banks of smaller units to provide a given capacity. Instead of placing the apparatus directly in the room it could be placed in any convenient location outside of the room and connected thereto by ducts. For example, one or more units might be used in connection with a central air conditioning system to treat the air circulated through an entire building.

While one embodiment of the invention has been shown and described in detail, it will be understood that this is illustrative only and is not to be taken as a definition of the scope of the invention reference being had for this purpose to the appended claim.

What is claimed is:

Air treating apparatus comprising a tank adapted to contain a body of liquid, a pipe extending vertically downwardly into the tank and providing an inlet for air, outlet apertures in the top wall of the tank, a second pipe telescoping with said inlet pipe, a casing communicating with said last mentioned pipe and providing an air chamber below the surface of said liquid, said casing having openings therein to permit the escape of air into the body of liquid, a perforated plate fixed to said second pipe, float means for supporting said plate at a spaced distance above the liquid level, said plate substantially covering the distance between the walls of said tank, and a plurality of screens of finer mesh than the perforations of said plate and supported by said plate at spaced distance thereabove.

CHARLES F. J. DUPUY.